Sept. 29, 1936. H. E. TAUTZ 2,055,916
CHUCK
Filed Oct. 1, 1934
FIG. 1
FIG. 3
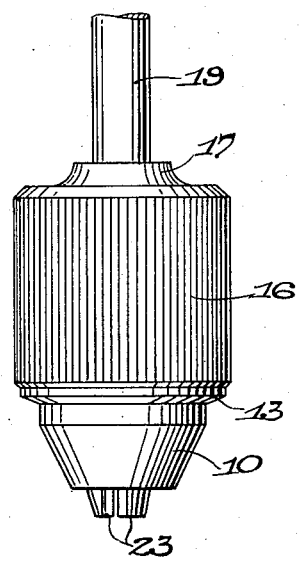
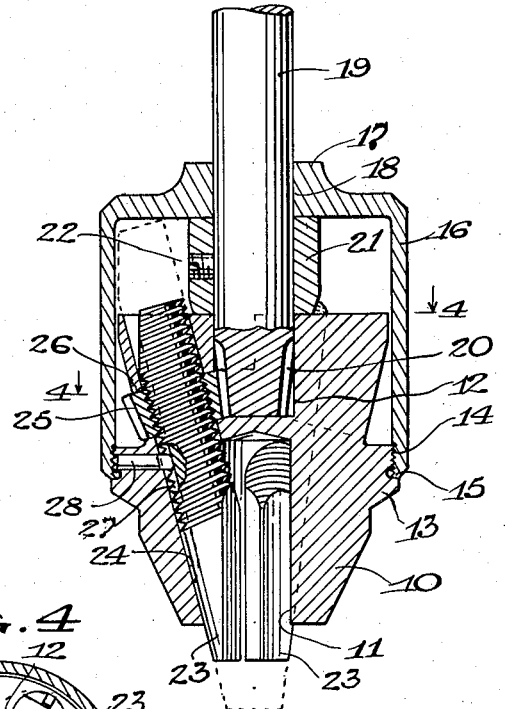
FIG. 2
FIG. 4
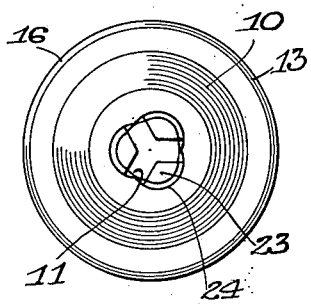
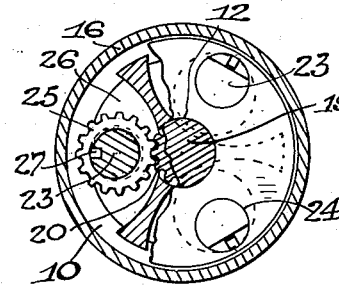
FIG. 5
FIG. 6
FIG. 7
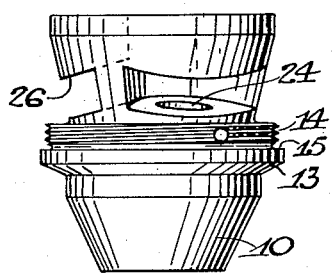
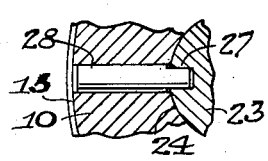
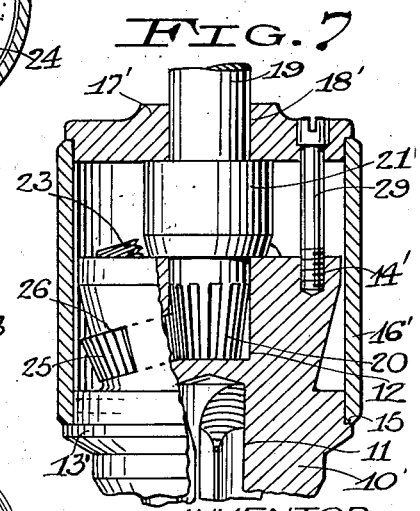
FIG. 8
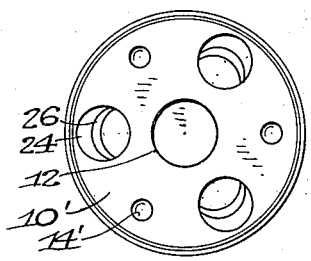
WITNESSES
L. E. Kilian
C. L. Naal
INVENTOR
Herbert E. Tautz
By R. S. Caldwell
ATTORNEY Patented Sept. 29, 1936

2,055,916

UNITED STATES PATENT OFFICE 2,055,916

CHUCK

Herbert E. Tautz, Milwaukee, Wis., assignor to The Delta Manufacturing Company, Milwaukee, Wis., a corporation of Wisconsin Application October 1, 1934, Serial No. 746,352

2 Claims. (Cl. 279—60)

The invention relates to chucks of the type for holding drills and other tools.

An object of the invention is to provide a chuck which is of simple but durable construction, and which is easily assembled and operated.

The invention further consists in the several features hereinafter described and claimed.

In the accompanying drawing, illustrating two specific embodiments of the invention, Fig. 1 is a side elevation of a chuck constructed in accordance with the invention;

Fig. 2 is an end view of the chuck;

Fig. 3 is a longitudinal sectional view of the chuck;

Fig. 4 is a transverse sectional view of the chuck, taken on the line 4—4 of Fig. 3;

Fig. 5 is a side view of a chuck body forming a part of the device;

Fig. 6 is a detail sectional view of a chuck jaw guiding means;

Fig. 7 is a longitudinal sectional view of a modified form of chuck, and

Fig. 8 is a top plan view of the chuck body for the chuck of Fig. 7.

In that form of chuck shown in Figs. 1 to 6, the numeral 10 designates a chuck body having coaxial central bores 11 and 12 in its opposite ends. The end of the body with the bore 11 has the usual tapered form, while the other end is preferably of conical shape, diverging from a peripheral rib 13 formed about the body. The rib 13 has a portion of reduced diameter having a screw thread 14 and forming a shoulder 15.

A sleeve or housing 16 is engaged at one end on the screw thread 14 and has a binding abutment with the shoulder 15. At the other end the sleeve has a hub portion 17 with a bore 18 coaxial with the bores 11 and 12. A rotatable supporting member or spindle 19 is received in the body bore 12 and sleeve bore 18, the end of the spindle in the bore 12 having formed thereon a bevel gear 20. A collar 21 is secured to the spindle by a set screw 22 or other suitable means and is interposed between the hub portion 17 and the adjacent end of the body 10. The outer surface of the sleeve 16 is fluted or knurled to form a hand grip. The spindle forms a support by means of which the body and sleeve are rotatably mounted.

The body 10 carries chuck jaws 23, preferably three in number, and preferably in the form of round rods. Bores or apertures 24 extend lengthwise through the body to slidably receive the jaws, and converge toward the forward end of the body, each bore 24 communicating with the bore 11 and extending at an angle therefrom to the opposite end of the body. The tool-engaging ends of the jaws are cut away to form the usual clamping edges. The rod-like jaws are screw-threaded and pass through respective nut-forming gears 25 which mesh with the spindle gear 20 and are disposed in pockets or recesses 26 milled in the body 10 to confine the gears against axial displacement with respect to the body, the pockets opening at the outer periphery of the body to facilitate the formation of the pockets and the mounting of the gears. To conserve space, the upper ends of the jaws 23 may be cut away at their outer sides, as seen in Fig. 3. Each jaw has a longitudinal keyway 27 cut therein to receive the flatted inner end of a pin 28 driven into the chuck body, thereby preventing rotation of the jaw about its axis. The outer ends of the pins 28 are covered by the threaded end of the sleeve 16.

In assembling the device, the nut-forming gears 25 are inserted into the pockets 26 of the chuck body and the jaws are then inserted into the bores 24 of the body and threaded through the gears. The pins 28 may be driven into the body before or after the jaws are inserted. Each of the first two jaws is moved to its extreme retracted position to permit entry of the second and third jaws. The supporting member or spindle 19 is inserted through the hub portion of the sleeve and the collar 21 is then secured to the spindle. The spindle end is thereupon inserted into the chuck body and the sleeve screwed onto the chuck body to complete the assembly.

The chuck jaws are moved in and out by relative rotation between the chuck body and spindle, the nut gears 25 on the jaws being thereby rotated by the spindle gear 20. To effect the jaw movement, the user may either turn the chuck body 10 by means of the attached sleeve while the spindle 19 is stationary, or hold the chuck body against rotation while the spindle turns. The tightening of the jaws against the drill or other tool serves to lock the body to the spindle, so that the body and spindle will rotate together.

When the chuck is in use, axial thrust is taken by the collar 21, although the end of the spindle gear 20 may also form a thrust surface. The extreme advanced position of the chuck jaws is indicated by dotted lines at the lower end of Fig. 3, and the extreme retracted position of one of the jaws is indicated by dotted lines at the upper end of the sleeve 16 in Fig. 3.

In the modified form of chuck shown in Figs. 7 and 8, the body 10' is similar to the body 10 except that the screw thread 14 is omitted and tapped holes 14' are provided in the upper end of the chuck body. The sleeve or housing 16 of the Fig. 3 device is replaced by a tubular member 16' fitting on the shouldered peripheral rib 13' of the body and also fitting on the shouldered edge of an end plate 17' having a bore 18' for receiving the spindle 10. The body, sleeve, and end plate are held firmly together by screws 29 passing through the end plate and having a threaded engagement in the tapped holes 14' of the chuck body. In some instances, the tubular member may be integral with the end plate, as in the Fig. 3 device.

The assembly of the chuck of Fig. 7 is generally similar to that of the Fig. 3 device, and the operation of the two devices is the same.

What I claim as new and desire to secure by Letters Patent is:

1. A chuck comprising a body having forwardly converging apertures, externally screw-threaded chuck jaws movable in said apertures, nut-forming gears rotatably threaded on said jaws and confined against axial movement, a supporting member for said body rotatable with respect to said body and having a gear meshing with said nut-forming gears to displace said jaws by relative rotation between said supporting member and body, and a sleeve rigidly secured to said body to enclose said gears and the rearward portions of said jaws and having a bearing for said supporting member.

2. A chuck comprising a body having apertures, chuck jaws movable in said apertures, a supporting member for said body, actuating means cooperating with said supporting member for effecting axial movement of said chuck jaws by relative rotation between said body and supporting member, a tubular member enclosing said actuating means and engaging said body, an apertured end member for said tubular member, and means for securing said end member to said body and clamping said tubular member to said body and end member.

HERBERT E. TAUTZ.